US007748221B2

(12) United States Patent
Patel et al.

(10) Patent No.: US 7,748,221 B2
(45) Date of Patent: Jul. 6, 2010

(54) COMBUSTOR HEAT SHIELD WITH VARIABLE COOLING

(75) Inventors: Bhawan B. Patel, Mississauga (CA); Lorin Markarian, Etobicoke (CA); Stephen Phillips, Etobicoke (CA); Eduardo Hawie, Woodbridge (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 763 days.

(21) Appl. No.: 11/561,090

(22) Filed: Nov. 17, 2006

(65) Prior Publication Data

US 2008/0115499 A1 May 22, 2008

(51) Int. Cl.
*F02C 1/00* (2006.01)
*F02G 3/00* (2006.01)

(52) U.S. Cl. .......................................... 60/752; 60/756

(58) Field of Classification Search .................. 60/804, 60/752–760, 748, 740
See application file for complete search history.

(56) References Cited

U.S. PATENT DOCUMENTS

| | | | | |
|---|---|---|---|---|
| 2,669,090 | A | 2/1954 | Jackson | |
| 3,169,367 | A | 2/1965 | Hussey | |
| 3,608,309 | A | 9/1971 | Hill et al | |
| 4,226,088 | A | 10/1980 | Tsukahara et al. | |
| 4,246,757 | A | 1/1981 | Heberling | |
| 4,246,758 | A | 1/1981 | Carvel et al. | |
| 4,475,344 | A | 10/1984 | Mumford et al. | |
| 4,590,769 | A | 5/1986 | Lohmann et al. | |
| 4,702,073 | A | 10/1987 | Melconian | |
| 4,870,818 | A | 10/1989 | Suliga | |
| 4,914,918 | A | 4/1990 | Sullivan | |
| 4,934,145 | A | 6/1990 | Zeisser | |
| 5,117,637 | A | 6/1992 | Howell et al. | |
| 5,129,231 | A | 7/1992 | Becker et al. | |
| 5,165,226 | A | 11/1992 | Newton et al. | |
| 5,222,358 | A | 6/1993 | Chaput et al. | |
| 5,253,471 | A | 10/1993 | Richardson | |
| 5,271,219 | A | 12/1993 | Richardson | |
| 5,307,637 | A | 5/1994 | Stickles et al. | |
| 5,353,865 | A | 10/1994 | Adiutori et al. | |
| 5,396,759 | A * | 3/1995 | Richardson | 60/804 |
| 5,398,509 | A | 3/1995 | North et al. | |
| 5,419,115 | A * | 5/1995 | Butler et al. | 60/804 |
| 5,590,531 | A | 1/1997 | Desaulty et al. | |
| 5,894,732 | A * | 4/1999 | Kwan | 60/756 |
| 5,934,066 | A | 8/1999 | Schmid et al. | |
| 5,956,955 | A * | 9/1999 | Schmid | 60/748 |
| 5,974,805 | A | 11/1999 | Allen | |
| 5,996,335 | A | 12/1999 | Ebel | |
| 6,032,457 | A | 3/2000 | McKinney et al. | |
| 6,164,074 | A | 12/2000 | Madden et al. | |
| 6,427,446 | B1 | 8/2002 | Kraft et al. | |
| 6,497,105 | B1 * | 12/2002 | Stastny | 60/796 |

(Continued)

FOREIGN PATENT DOCUMENTS

EP 0 774 100 B1 9/1998

(Continued)

*Primary Examiner*—William H Rodríguez
(74) *Attorney, Agent, or Firm*—Ogilvy Renault LLP

(57) ABSTRACT

A combustor heat shield has a body with heat exchange promoting protuberances extending from a back face thereof. The density of protuberances is less in hot spot regions than in other heat shield regions which require less cooling.

8 Claims, 8 Drawing Sheets

U.S. PATENT DOCUMENTS

| | | | | |
|---|---|---|---|---|
| 6,557,349 | B1 | 5/2003 | Young et al. | |
| 6,655,027 | B2 | 12/2003 | Kastrup et al. | |
| 6,672,073 | B2 | 1/2004 | Wiebe | |
| 6,679,063 | B2 | 1/2004 | Ebel | |
| 6,751,961 | B2 * | 6/2004 | Pacheco-Tougas et al. | 60/752 |
| 6,792,757 | B2 | 9/2004 | Borns et al. | |
| 6,842,980 | B2 | 1/2005 | Young et al. | |
| 6,986,253 | B2 | 1/2006 | Leen et al. | |
| 7,093,439 | B2 * | 8/2006 | Pacheco-Tougas et al. | 60/752 |
| 7,363,763 | B2 * | 4/2008 | Coughlan et al. | 60/752 |
| 2003/0213249 | A1 | 11/2003 | Pacheco-Tougas et al. | |
| 2008/0104962 | A1 * | 5/2008 | Patel et al. | 60/752 |
| 2008/0282703 | A1 * | 11/2008 | Morenko et al. | 60/796 |

FOREIGN PATENT DOCUMENTS

| | | | |
|---|---|---|---|
| EP | 0 797 746 | B1 | 5/1999 |
| EP | 0 797 748 | B1 | 5/1999 |
| EP | 0 823 035 | B1 | 2/2000 |
| EP | 1 148 299 | A1 | 10/2001 |
| EP | 0 837 286 | B1 | 10/2002 |
| EP | 0 816 761 | B1 | 9/2003 |
| EP | 1 193 451 | B1 | 1/2005 |
| WO | WO 95/30115 | | 11/1995 |

* cited by examiner

COMBUSTOR HEAT SHIELD WITH VARIABLE COOLING

TECHNICAL FIELD

The invention relates generally to gas turbine engine combustors and, more particularly, to combustor heat shield cooling.

BACKGROUND OF THE ART

Heat shields, which protect the dome panel of combustor shells, are exposed to hot gases in the primary combustion zone. The amount of coolant available for cooling the heat shields must be minimized to improve the combustion efficiency and to reduce the smoke, unburned hydrocarbon and CO/NOx emission. Example heat shields are shown in U.S. Pat. Nos. 4,934,145 and 5,419,115.

There is a continuing need for improved heat shields and cooling schemes.

SUMMARY

In one aspect, there is provided a heat shield comprising a body adapted to be mounted adjacent and spaced apart a distance from a dome of an annular combustor to define a cavity therebetween, the body defining at least one fuel nozzle opening, the body having a back face facing the combustor dome when mounted to the combustor, the back face having at least an outer region, an inner region and a central region between the inner and outer regions, the outer region being radially outward of the central region and the inner region being radially inward of the central region relative to a central axis of the combustor when the heat shield is mounted to the combustor, the central region being in airflow communication with the outer region and the inner region within the cavity, the back face having a plurality of protuberances extending from the back face in the inner, outer and central regions, the inner and outer regions each having a lower concentration density of protuberances than the central region.

In a second aspect, there is provided a combustor dome comprising at least one heat shield mounted to an annular dome panel, at least one fuel nozzle opening defined in the heat shield, the heat shield having a back face facing the dome panel, the back face and the dome panel defining an air space therebetween, a ridge provided on said back face and extending on each side of the nozzle opening on arc generally common with a centre of the nozzle opening, the ridge separating an inner central region from an outer central region, the inner central region being disposed radially inwardly of the ridge relative to a central axis of the combustor dome, the outer central region being disposed radially outwardly of the ridge relative to the central axis of the combustor dome, the back face having radially inner and radially outer peripheral regions respectively located radially inwardly of the inner central region and radially outwardly of the outer central region, pin fins provided on said back face, the density of pin fins in the inner and outer central regions being higher than in the radially inner and radially outer peripheral regions, and cooling holes defined in the dome panel on either side of the ridge in general alignment with the inner and outer central regions to direct cooling air against the back face of the heat shield in said inner and outer central regions, the inner and outer central regions being respectively in fluid flow communication with said radially inner peripheral region and said radially outer peripheral region for causing the cooling air received in said inner and outer central regions to respectively flow over said radially inner peripheral region and said radially outer peripheral region before being radially discharged from the heat shield into the combustor dome.

In accordance with another aspect, there is provided a combustor heat shield adapted to be mounted adjacent and spaced apart a distance from a dome panel of a combustor dome to define a cavity therebetween, the heat shield comprising a body with heat exchange promoting protuberances extending from a back face thereof, the back face having hot spot regions, said hot spot regions including a radially inwardly peripheral region, and wherein said hot spot regions have a protuberance density which is less than the protuberance density of another heat shield region which requires less cooling.

In accordance with a still further general aspect, there is provided a method for cooling a combustor heat shield having a back face, comprising: providing air to the heat shield back face, providing heat exchange promoting protuberances on the back face, providing a reduced density of protuberances in an area requiring increased cooling, thereby increasing cooling flow rate in the area.

DESCRIPTION OF THE DRAWINGS

Reference is now made to the accompanying figures, in which.

DETAILED DESCRIPTION OF THE PREFERRED EMBODIMENTS

Figure 1:
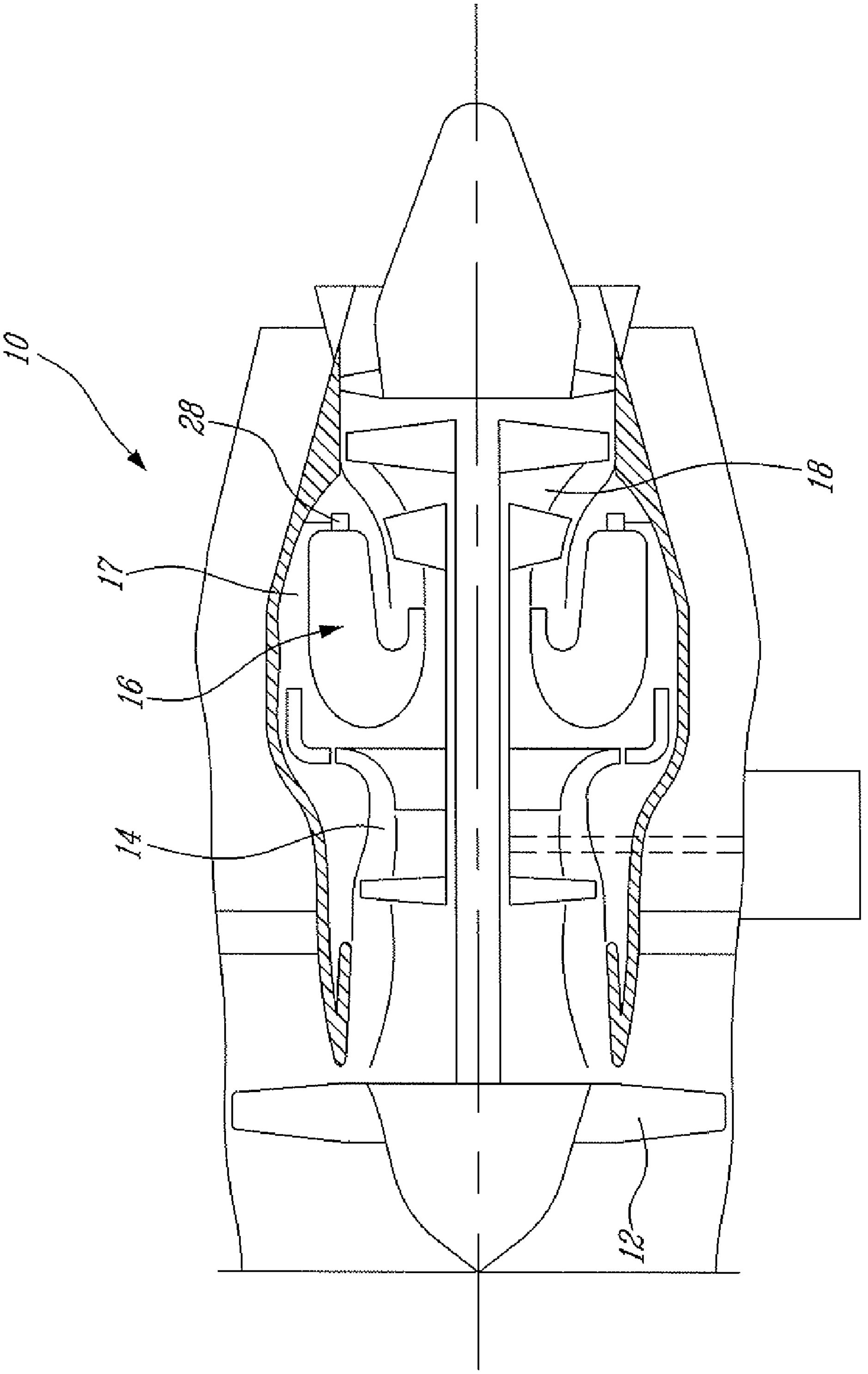
FIG. 1 is a schematic cross-sectional view of a turbofan engine having a reverse flow annular combustor and dome panel heat shields.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
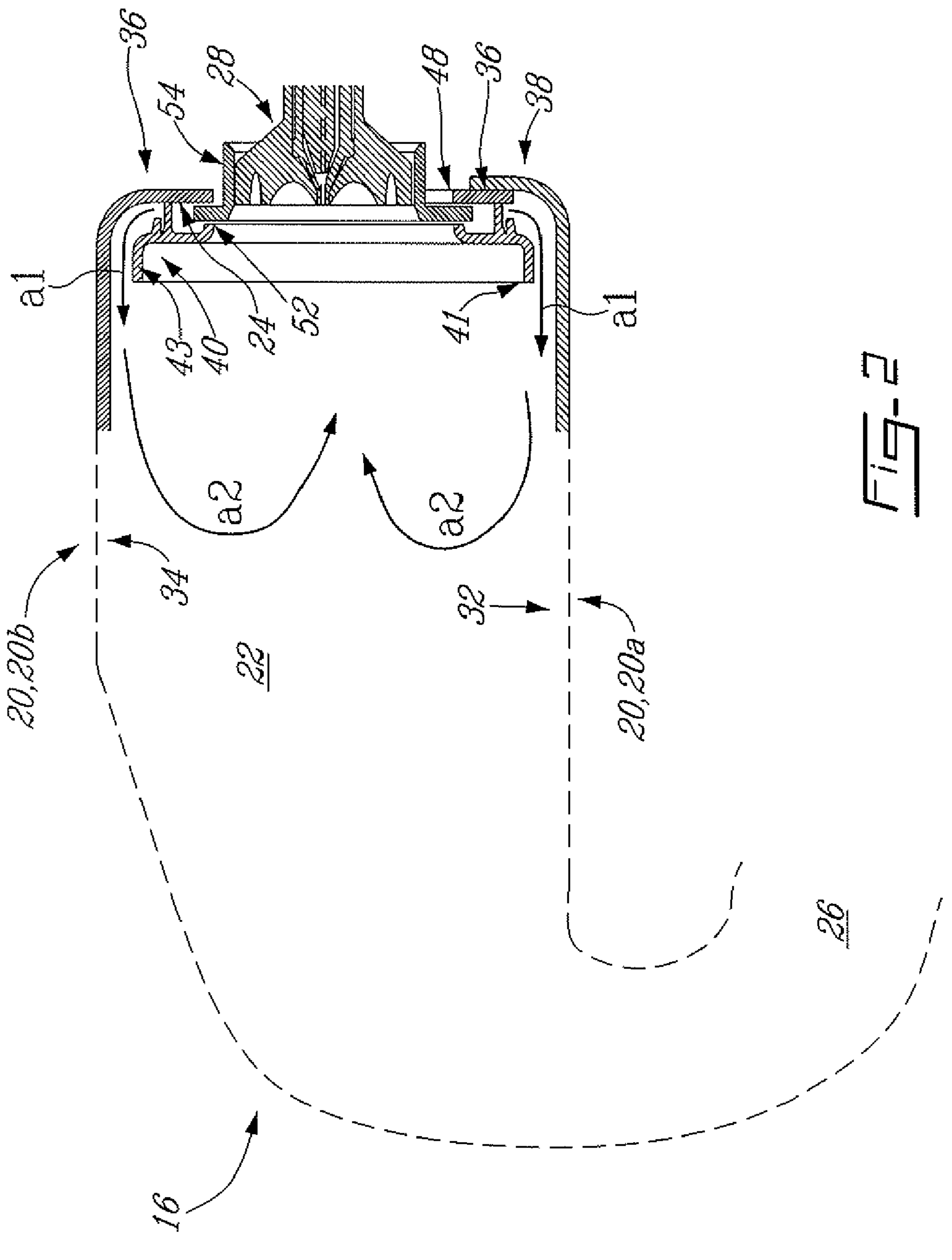
FIG. 2 is an enlarged view of a combustor shell of the engine combustor shown in FIG. 1.

The combustor 16 is housed in a plenum 17 supplied with compressed air from compressor 14. As shown in FIG. 2, the combustor 16 comprises a reverse flow annular combustor shell 20 composed of a radially inner liner 20*a* and a radially outer liner 20*b*, defining a combustion chamber 22. The combustor 16 has a bulkhead or inlet dome portion or panel 24 and an exit potion 26 for communicating combustion gases with the turbine section 18. As shown in FIG. 1, a plurality of fuel nozzles 28 are mounted to extend through the inlet dome end portion 24 of the combustor 20 to deliver a fuel-air mixture to the chamber 22.

A plurality of effusion holes (not shown) are preferably defined in the inner and outer liners 20*a* and 20*b* for cooling purposes, and dilution holes (not shown) are also preferably provided for combustion purposes. Inner and outer liners 20*a* and 20*b* may have any suitable configuration, and thus are shown in dotted line only in FIG. 2. The inner and outer liners 20*a* and 20*b* are preferably made out of sheet metal, though any suitable material(s) and manufacturing method(s) may be used. A thermal barrier coating (not shown) is preferably applied to the inner or combustion facing surfaces 32, 34 of the liners 20*a* and 20*b* to protect them against the high temperatures prevailing in the combustion chamber 22.

As shown in FIG. 2, the inner and outer liners 20*a* and 20*b* respectively include flanges 38 and 36 which overlap each other so as to form the dome panel 24 of the combustor shell 20 (Alternatively, any other suitable dome panel could be employed). The flanges 36 and 38 are directly fixedly secured together by a plurality of circumferentially distributed dome heat shields 40 mounted inside the combustion chamber 22 to protect the end wall of the dome 24 from the high temperatures in the combustion chamber 22. The dome heat shields 40 are typically castings made out of high temperature materials. Each dome heat shield 40 has a plurality of threaded studs 42 (four according to the example shown in FIG. 4) extending from a back face of the heat shield and through holes 44 (FIG. 3) defined in flanges 36 and 38. Self-locking nuts 46 are threadably engaged on the studs 42 from outside of the combustion chamber 22 for holding flanges 36 and 38 (and thus inner and outer liners 20*a* and 20*b*), and the dome heat shields 40 tightly together.

Figure 3:
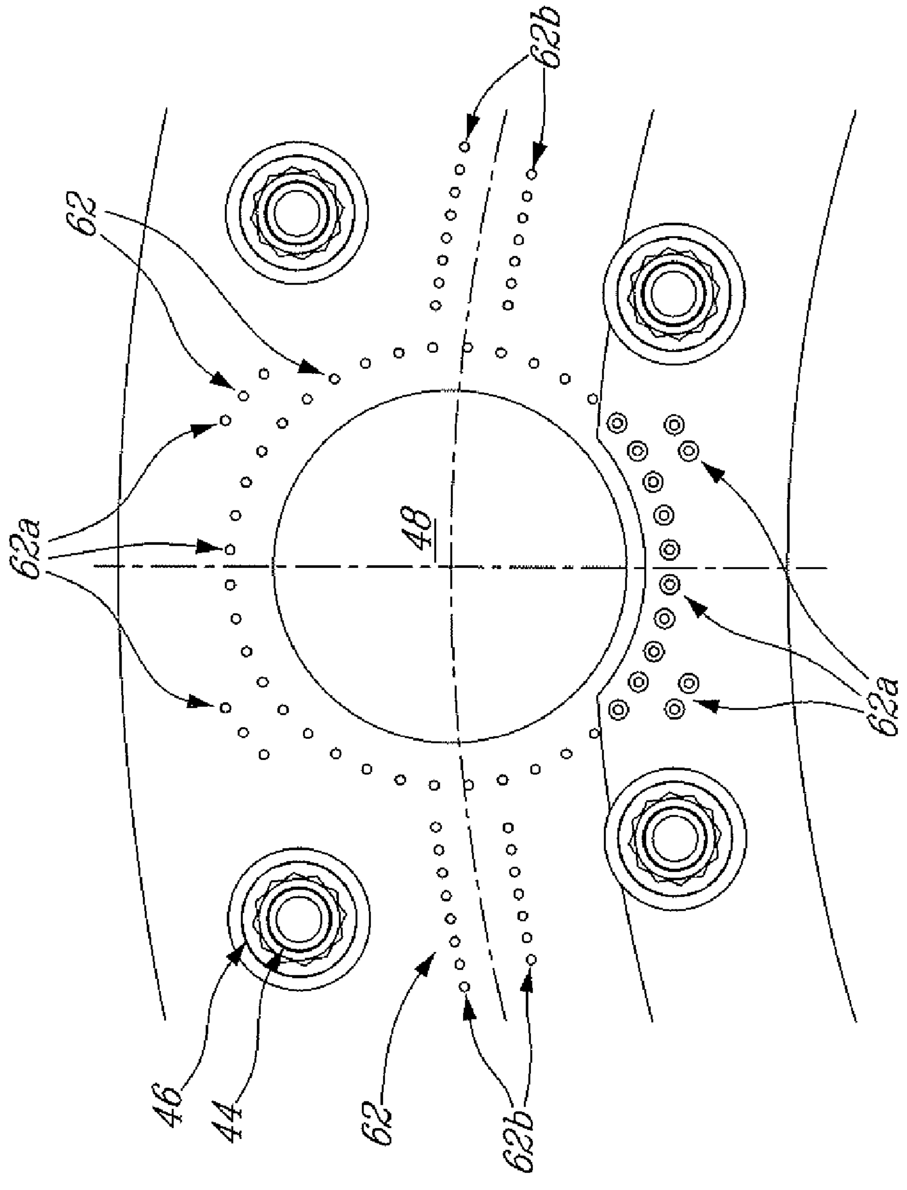
FIG. 3 is an outside end view of the dome panel of the combustor shell, illustrating an impingement hole pattern.

As shown in FIGS. 2 and 3, fuel nozzles openings 48 are defined through the dome panel 24 for allowing mounting of the fuel nozzles 28 to the combustor 16. A central hole 52 is defined in each of the heat shields 40 and is aligned with a corresponding fuel nozzle opening 48 for accommodating an associated fuel nozzle therein. As illustrated in FIG. 2, a floating collar 54 is mounted in the nozzle opening 48 to provide sealing between the combustor shell 20 and the fuel nozzles 28 while allowing relative movement therebetween. The floating collar 54 has an anti-rotation tab (not shown) which fits within an anti-rotation slot 55 on heat shield 40 (see FIG. 4.) The fuel nozzles 28 are slidably received in the floating collars 54. The floating collars 54 are axially trapped between the heat shields 40 and the end wall (i.e. flange 36) of the combustor dome 24. The fuel nozzle openings 48 are slightly oversized relative to the floating collars 54, thereby allowing limited radial movement of the collars 54 with the fuel nozzles 28 relative to the combustor shell 20.

Figure 2B:
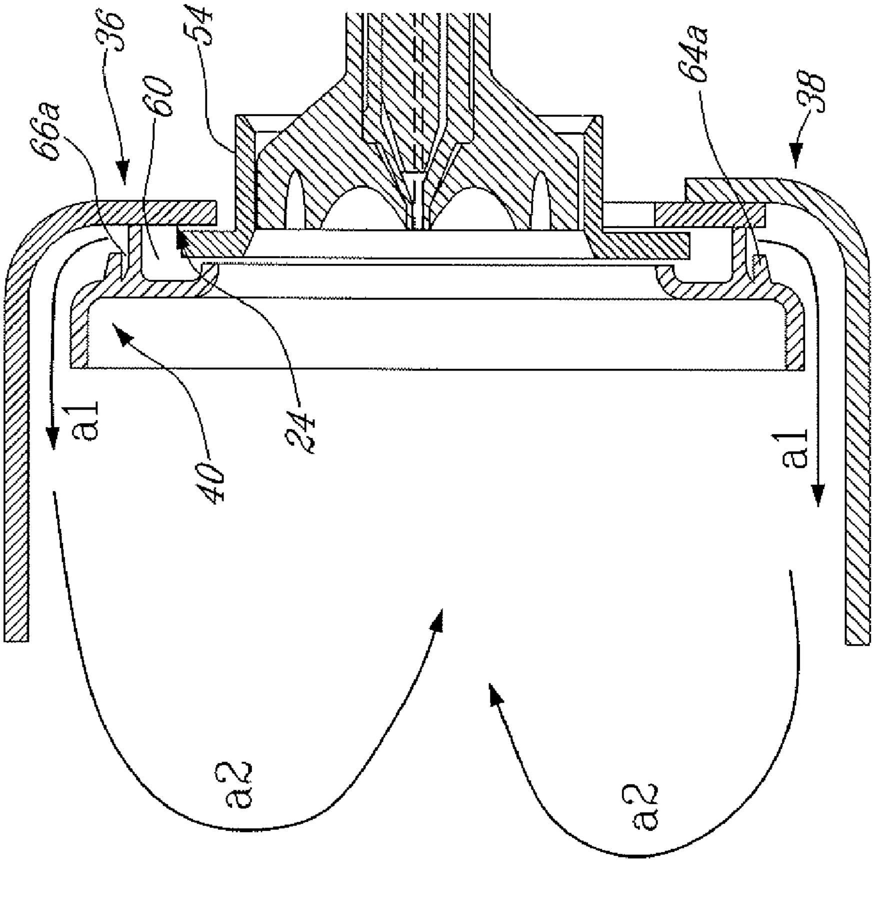
FIG. 2*b* is an enlarged view of FIG. 2.

As shown in FIG. 2*b*, the heat shields 40 are spaced from the dome panel 24 by a distance of about 0.1 inch so as to define a heat shield back face cooling air space 60. Relatively cool air from plenum 17 is admitted in the back cooling air space 60 via impingement holes 62 defined in the dome panel of the combustor shell 20 (see FIG. 3). The impingement hole patterns are arranged in the dome panel of the combustor shell 20 to optimize the heat shield cooling, in co-operation with pin fins located on the heat shield, as will be described further below. As shown in FIG. 3, the impingement holes include a first set of holes 62*a* arranged on two circular paths concentrically arranged with fuel nozzle opening 48. Preferably the inner circle of set 62*a* comprises holes equally spaced on a first pitch about the nozzle opening 48, while the outer circle of set 62*a* comprises only 10 holes (6 outer and 4 inner) but on a pitch similar to the first pitch. Placement of the outer circle of set 62*a* will be discussed further below. Holes 62*b* are also provided in two rows extending laterally from each side of nozzle hole 48, both rows concentric with the central axis of the annular combustor 20. Preferably the holes 62 of inner row have an angular position which is staggered relative to the holes of the outer row of the set of 62*b*. Preferably 8 holes are provided in the outer row, and 7 holes 62 on the inner row, in each set 62*b* on either side of nozzle hole 48. Though this is the preferred embodiment, other hole placements and numbers maybe used. Placement of the holes 62 of set 62*b* will also be discussed further below. Holes 62 are preferably straight-through holes generally perpendicular to the dome panel face, thus having an axis generally parallel to the combustor (or engine) axis. By placing holes sets 62*a* and 62*b* in circular arrays allows the holes to be laser drilled using drilling-on-the-fly (DOF) techniques, which speeds manufacturing time. As will be discussed further below, impingement holes 62 are positioned and arranged directly (i.e. generally perpendicularly) above reduced-height pin fins 64*a* on the back face of the heat shield to improve cooling by minimising the resistance to the air flow, which facilitates combustor cooling where a low pressure drop or gradient is available to energize combustor cooling. This allows for an optimized cooling to be achieved on the heat shield while still providing enough momentum to the air exiting from behind the heat shield to form a uniform film around the circumference of the surfaces 32 and 34 of the inner and outer liners.

Figure 4:
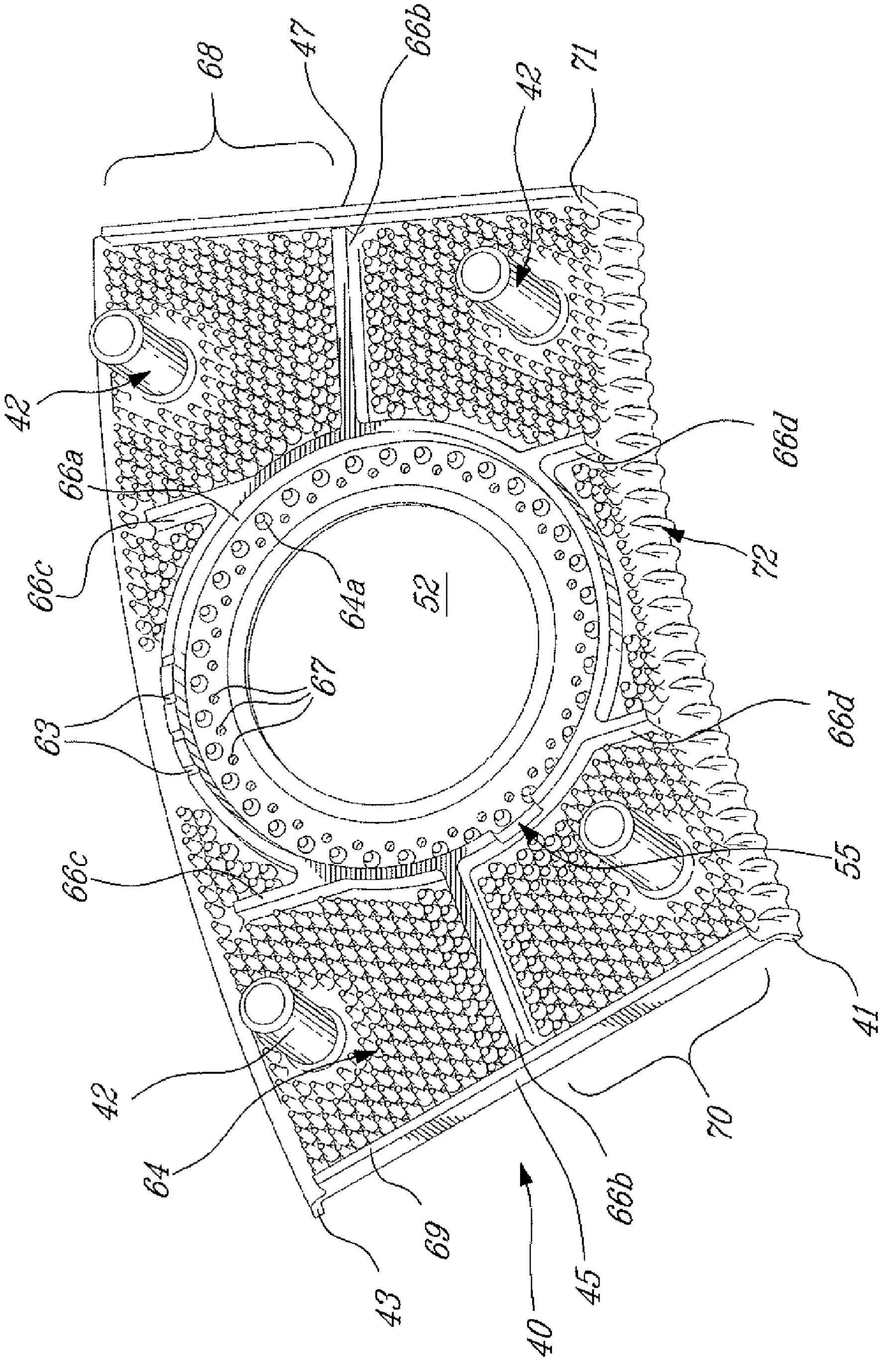
FIG. 4 is a perspective view of a back face of a dome heat shield of the combustor.
Figure 5:
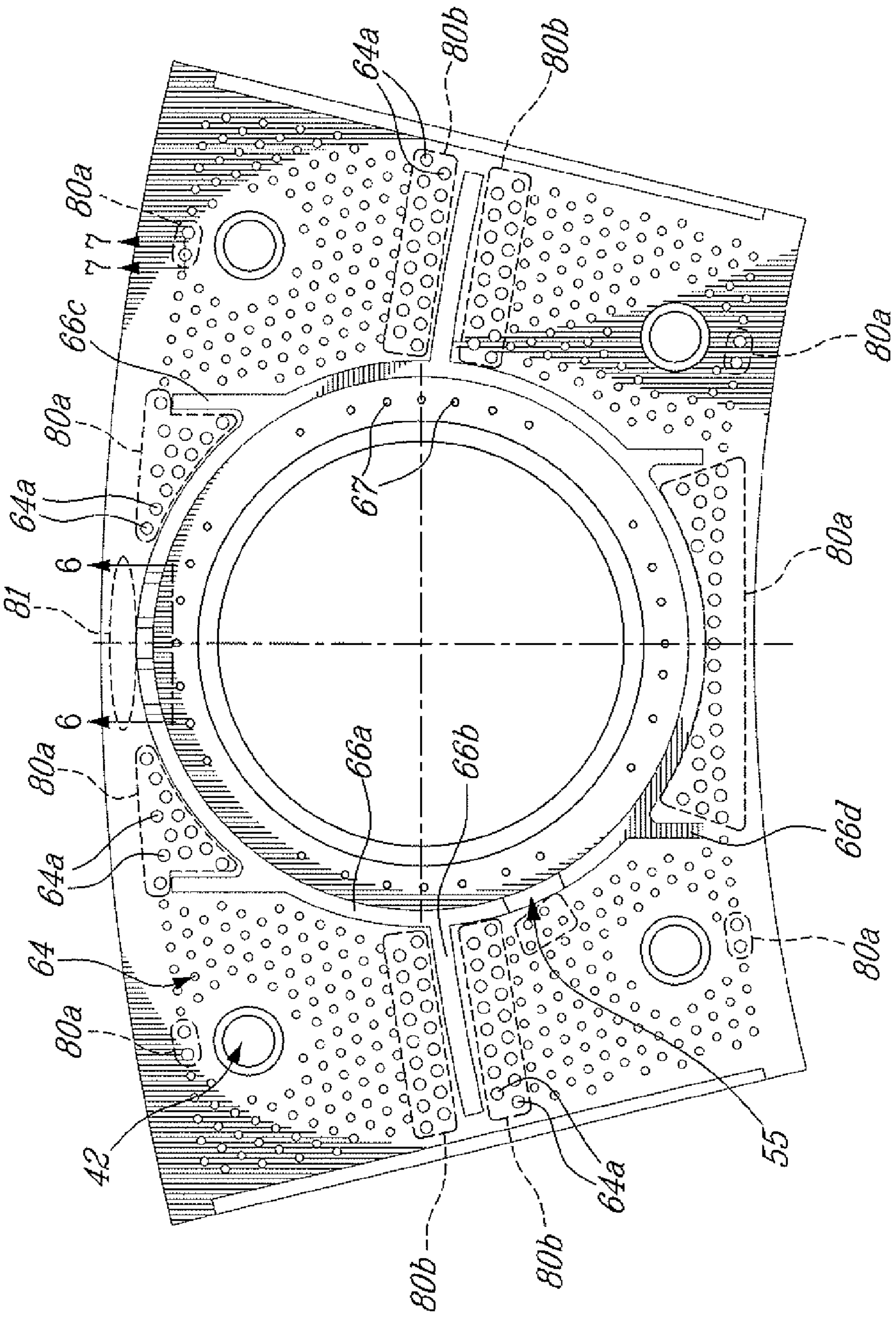
FIG. 5 is a plan view of a back face of the heat shield shown in FIG. 4.

FIGS. 4 and 5 show an individual dome heat shield 40. Each heat shield 40 is provided in the form of a circular sector having a radially inner lip 41, having a plurality of ribs 72 discussed further below, a radially outer lip 43 and lateral edges 45, 47 extending between the inner and outer lips 41 and 43. Heat exchange promoting protuberances, such as pin fins 64, pedestals or other raised cooling structures, are provided preferably in rows, and preferably in staggered position from row to row, on the back face of the heat shields 40 for augmenting the heat transfer between the back face and the cooling air. The pin fin density and location are defined based on the heat shield hot spots and to minimize the pressure drop, as will be discussed further below. As will be discussed further below, the pin fins 64 have different heights, depending on their location on the back face of the heat shield 40. The pin fin 64 height is preferably substantially the same as the distance between the heat shield back face and the inner surface of the dome panel (e.g. in this example, about 0.095" to 0.1" from the back face). The pin fin-to-pin fin spacing is based on required cooling, and in the present embodiment ranges from 0.05 inch to 0.1 inch. Each pin fin 64 preferably has a frustoconical shape.

As shown in FIGS. 4 and 5, ribs or ridges 66 are provided extending from the back face of the heat shields 40 to strengthen the heat shield and direct the flow of cooling air as desired, as will be discussed further below. The ridges 66 preferably extend from the heat shield back face all the way into substantially sealing contact with the inner surface of the dome panel (e.g. in this example, about 0.095" to 0.1" from the back face), and thus more or less sealingly engage the dome panel and thereby direct the cooling air from impingement hole sets 62*a* and 62*b* to the various regions of the heat shield, as will be described further below. The ridges 66 include a central circular ridge 66*a* concentrically disposed with the fuel nozzle opening 52, a pair of generally diametrically opposed primary ridges 66*b* extending laterally from the central circular ridge 66*a*, a pair of generally radially disposed ridges 66*c* extending radially outwardly from the central circular ridge 66*a*, and a pair of generally radially disposed ridges 66*d* extending radially inwardly from the central circular ridge 66*a*.

Figure 5B:
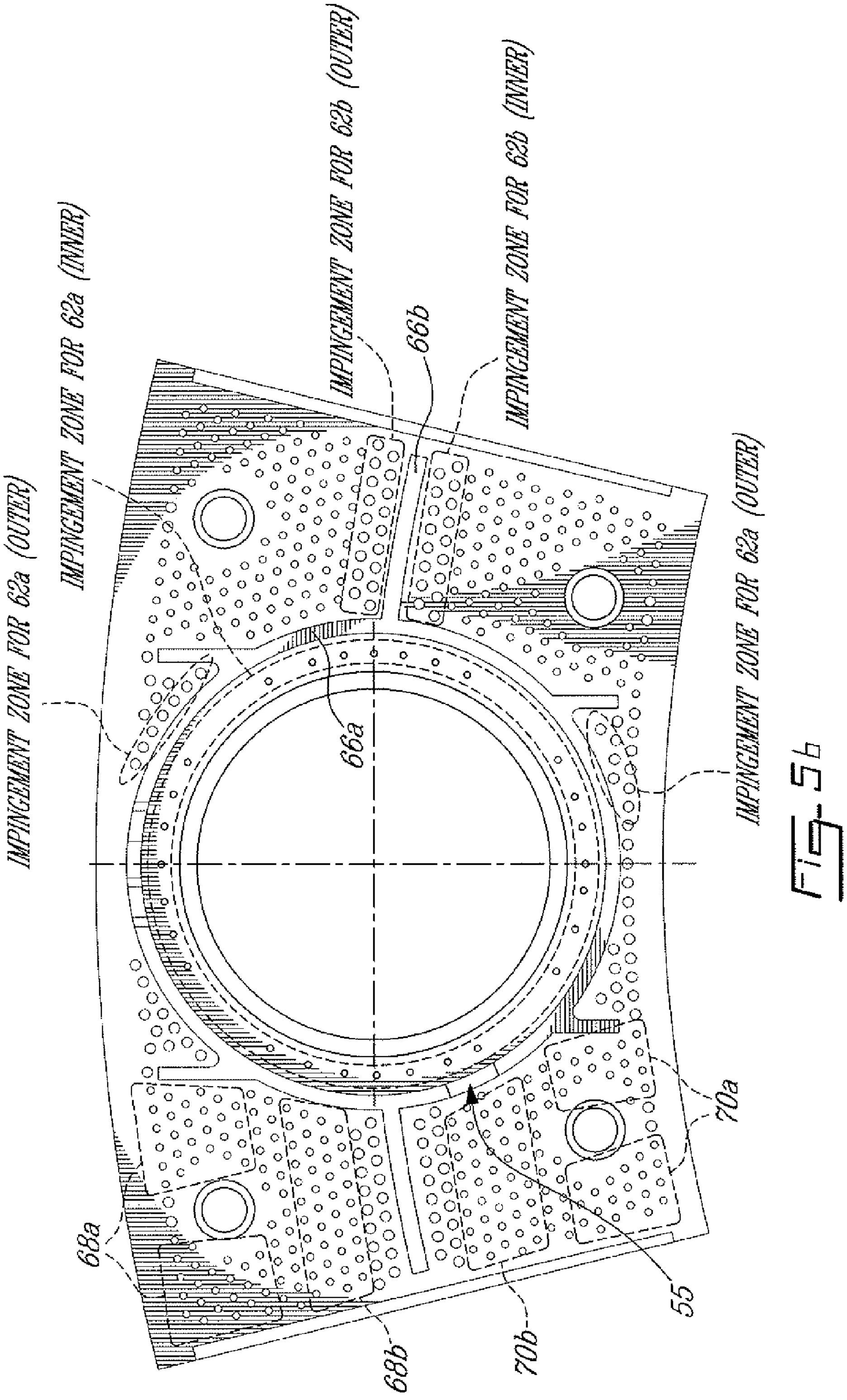
FIG. 5*b* is a view similar to FIG. 5*a*, showing impingement areas and pin fin density regions.
Figure 7:
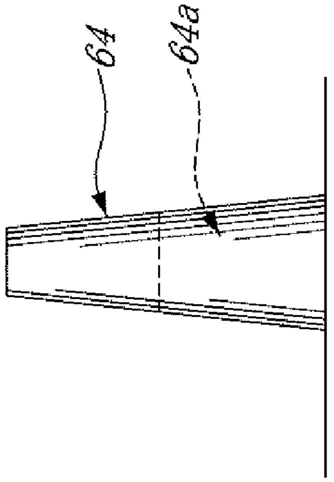
FIG. 7 is a sectional view of the indicated portion of FIG. 5 indicated 7-7.
Figure 6:
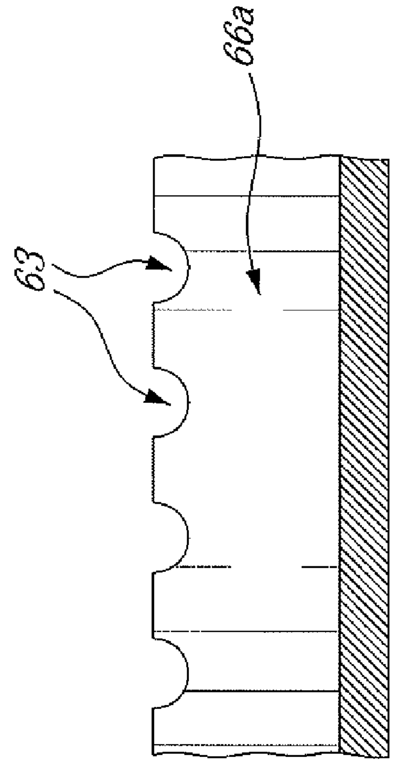
FIG. 6 is a sectional view of the portion of FIG. 5 indicated 6-6.

As shown in FIG. 2, the central circular ridge 66*a* preferably extends around fuel nozzle opening 52 in the heat shield in sealing contact with the inner surface of the dome panel. Referring to FIG. 5*b*, the areas of impingement by air passing through holes 62 of sets 62*a* and 62*b* are indicated by corresponding ellipses overlaid on the heat shield 40. As can be seen from FIG. 5*b*, the rows of impingement holes 62*a* align with one on either side of the central circular ridge 66*a*. Outer circle of holes 62 of set 62*a* generally align with the short pin fins 64*a* adjacent the central circular ridge 66*a*. Referring again to FIGS. 4 and 5, the cooling air from holes 62 of the inner circle of the set 62*a* impinges upon the portion of the back surface of the heat shield 40 bounded by circular ridge 66*a* and is then mostly directed into cooling holes 67 extending through the heat shield 40 for exhausting through the face of the heat shield. A portion of the cooling air, however, is directed through (preferably) four grooves 63 defined at the radially outer side of the heat shield through the circular ridge 66*a*. When mated against the combustor dome panel, the grooves 63 provide cooling holes or slots for allowing a portion of the cooling air to be discharged through the grooves 63 towards the radially outer lip 43 of the heat shield 40, as shown in FIG. 5, and thereby cool an adjacent area 81 where no pin fins 64 are provided, due to space limitations on the heat shield back face for a given dome panel and fuel nozzle geometry. Grooves 63 also permit a proper radial airflow to exit the back of the heat shield and into the combustion chamber 22 (e.g. see upper arrows a1 in FIGS. 2, 2*a*). The cooling air from holes 62 of the outer circle of the set 62*a* impinges upon the portion 80*a* (FIG. 5) of the back surface of the heat shield 40, and thus tends to be directed generally radially outwardly or radially inwardly, as the case may be, by the ridge 66*a* in co-operation with ridges 66*c* or 66*d*, as the case may be, due to the substantially sealing contact provided by the ridges 66 with the combustor dome panel. Also as shown in FIG. 4 (only), a circular array of short pin fins 64*a* may optionally be provided within circular ridge 66*a*.

Referring back to FIG. 4, ridges 66*b* extend laterally from the central circular ridge 66*a* such as to divide the back surface area of the heat shield 40 into a radially outer half 68 and a radially inner half 70 (the term "half" is used approximately). Ridges 66*b* preferably extend parallel to impingement holes 62 of set 62*b*, and disposed to be intermediate the inner and outer circle of holes 62 of set 62*b*, as can be seen with reference to FIG. 5*b*. Inner and outer circle of holes 62 of set 62*b* generally align with a first row of the short pin fins 64*a* immediately adjacent ridges 66*b*. Thus, the two rows (i.e. inner and outer circles) of impingement holes 62 of the set 62*b* in the dome panels are located one on either side of the ridges 66*b*. The air from impingement holes 62*b* impinges upon the portions 80*b* of the back face of the shield adjacent the ridges 66*b*, and thus tends to be directed generally radially outwardly or radially inwardly of the ridges 66*b*, as the case may be, due to the substantially sealing contact provided by the ridges 66 with the combustor dome panel.

As mentioned, the ridges 66*c* extend generally radially outwardly from opposed sides of the central circular ridge 66*a* towards, but stopping preferably short of, the radially outer lip 43. Likewise, the ridges 66*d* extend generally radially inwardly from opposed sides of the central circular ridge 66*a* towards, but stopping preferably short of, the radially inner lip 41. The ridges 66*c* are thus preferably generally aligned with the ridges 66*d*, and bound regions 80*a*, for radially directing cooling air in that region.

As mentioned, and shown in FIGS. 4 and 5, the heat shield 40 provided with arrays of "full height" pin fins 64 (i.e. extending substantially, but preferably not quite, the entire distance between the heat shield back face and the combustor dome panel, or about 0.090" to 0.1" in this example, and more preferably to 0.090" to 0.095"), however, in regions 80*a* and 80*b* (see FIG. 5), adjacent to ridges 66, partial height pin fins 64*a* are provided. Preferably, partial height pin fins 64*a* are about one half of the height of full-height pin fins 64, but otherwise have the same shape and configuration (i.e. preferably partial height pin fins 64*a* appear as a "sawed off" version of pin fins 64). The pin fin height is reduced to improve the impingement cooling effectiveness while maximizing surface area for heat transfer. The ratio ($R_{dh}$) of the diameter of cooling hole to the height from the impingement surface should preferably greater than one and less than five (i.e. $1<R_{dh}<5$) for maximum impingement cooling effectiveness. Depending on pin fin density in the impingement zone, the height from the impingement surface may be considered to be the distance from the impingement holes to either the tops of the pin fins, the heat shield back face surface, or a suitable averaging of the two. Typically, the first (pin fin tops) will be used. Thus, this desired requirement would not be met with a full-height pin fin 64, but in the current embodiment, the pin fins 64*a* and holes 62 can be respectively sized such that an optimum impingement height is achieved and an increased cooling surface area can still be provided in the impingement regions 80*a*, 80*b* of impingement holes 62. In the present example, the tops of reduced-height pin fins 64*a* are in the range of 0.045-0.055 below the impingement holes, and the impingement holes have a diameter in the range of 0.025-0.035, thus providing an $R_{dh}$ in the range of about 1.3 to 2.2 or, generally speaking, $1<R_{dh}<3$.

An area (unindicated) of pin fins 64 adjacent anti-rotation slot 55 may require height reduction to some extent, to avoid interference with the anti-rotation tab of floating collar 54.

The skilled reader will appreciate that, in general, a higher pin fin density will increase surface area, and thus generally increase heat transfer. However, in situations were insufficient flow is available to overcome the additional flow resistance provided by increased pin fin density, improvements are needed to augment heat transfer. Referring to FIG. 5*b*, at hot spots regions of the heat shield, such as the peripheral regions 68*a* and 70*a*, the pin fin 64 density is preferably reduced, relative to central regions 68*b* and 70*b*, to increase the heat transfer coefficients by increasing the coolant flow in these peripheral areas, by reducing flow resistance by reducing pin fin density to increase the flow. Preferably, pin fin densities in regions 68*a* and 70*a* are between 0.4 and 0.7 of the densities in regions 68*b* and 70*b*, respectively, however the exact densities will be determined based on cooling air flow and heat transfer requirements. For example, pin fin densities for regions 68*a*, 68*b*, 70*a*, and 70*b* may be 144, 250, 170 and 289 respectively. Due to lower overall pressure drop experienced in the hot spot regions 68*a* and 70*a* due to lower pin fin densities, the heat transfer is optimised by directing more coolant flow through these regions than would be possible if higher densities were used. It is noted that in this example, studs 42 correspond to regions 68*a* and 70*a*, although this is not necessary.

Lateral ridges or ribs 69 and 71 are provided at lateral edges 45, 47 of each heat shield 40 provide a means for redirecting the flow of cooling air behind the heat shield away from the interface of mating sides of adjacent heat shields 40, and thus impede leakage between adjacent heat shields. The cooling air directed through impingement holes 62 or set 62*b* is, thus, preferably eventually fully exhausted at the inner and outer lips 41 and 43 of each heat shield 40. As shown in FIG. 4, straightener ribs 72 can be provided along the inner and outer lips 41 and 43 to straighten the cooling air flow before being discharged in the combustion chamber 22.

In use, impingement holes 62*a* and 62*b* in the combustor dome allows air to pass into the cooling air space 60 between heat shield 40 back face and the combustor dome panel. The air from combustor impingement holes 62 of sets 62*a* impinges upon the partial height pin fins 64*a* in regions 80*a* on the back face area of the heat shield 40 adjacent circular ridge 66*a*, and air from combustor impingement holes 62 of set 62*b* impinges upon the partial height pin fins 64*a* in regions 80*b* on the back face area of the heat shield 40 adjacent ridges 66*b*. The partial height pins 64*a* provide sufficient clearance with the dome panel such that an optimal impingement height of 2-5 times the diameter of holes 62 is provided. After impinging the partial height pins 64*a*, impingement air moves generally radially relative the heat shield, to move past full height pin fins 64, in the case of air provided by holes 62 of set 62*b*. The splashed air from impingement holes 62*b* is caused to flow over the pin fins towards the inner and the outer lips 41 and 43 by the ridges 66, 69 and 71. This provides effective convection cooling. The air cools the back face of the heat shields by impingement and convection heat transfer. The cooling air is eventually discharged from the space 60 behind the heat shield at the inner and outer lips 41 and 43, where the flow may be straightened by the straightener ribs 72 before being expelled into the combustion chamber 22 to travel downstream along the inner and outer liners of the combustor. Once travelling along the combustor liners, dilution holes, etc. (not shown) redirect the flow into a double toroidal flow, as indicated by arrows a1 and a2 in FIG. 2. Meanwhile, the majority of the air received within circular ridge 66*a* impingement cools the back face of the heat shield 40 before flowing through the holes 67, preferably to provide cooling to the upstream face of the heat shield. The remaining portion of the air received within circular ridge 66*a* flows through grooves 63 to cool the back face of the heat shield radially outwardly therefrom, before being discharged radially at the outer lip 43.

The above description is meant to be exemplary only, and one skilled in the art will recognize that changes may be made to the embodiments described without department from the scope of the invention disclosed. For example, the invention can be provided in any suitable heat shield configuration and in any suitable combustor configuration, and is not limited to application in turbofan engines. Still other modifications which fall within the scope of the present invention will be apparent to those skilled in the art, in light of a review of this disclosure, and such modifications are intended to fall within the appended claims.

What is claim is:

1. A heat shield comprising a body adapted to be mounted adjacent and spaced apart a distance from a dome of an annular combustor to define a cavity therebetween, the body defining at least one fuel nozzle opening, the body having a back face facing the combustor dome when mounted to the combustor, a central ridge projecting laterally from opposed sides of the fuel nozzle opening and dividing the back face into a radially outer half and a radially inner half, said radially outer half having an outer central region adjacent said central ridge and a radially outermost region adjacent a radially outer edge of the heat shield, said outer central region being in airflow communication with said radially outermost region, said radially inner half having an inner central region adjacent said central ridge and a radially innermost region adjacent a radially inner edge of the heat shield, said inner central region being in airflow communication with said radially innermost region, a plurality of protuberances extending from the back face, the density of protuberances in said inner and outer central regions being greater than the density of protuberances in said radially innermost and outermost regions, wherein the inner and outer central regions receive cool in air admitted into the cavity, and wherein the inner and outer central regions direct the cooling air to the radially innermost and the radially outermost regions.

2. The heat shield defined in claim 1, wherein the radially innermost and outermost regions exhaust cooling air into the combustor in the radial direction.

3. The heat shield defined in claim 1, wherein the radially innermost and outermost regions, in use, require increased cooling relative to the inner and outer central regions.

4. The heat shield defined in claim 1, wherein the inner and outer central regions are adapted to be aligned with holes on the combustor for providing cooling air to the cavity.

5. The heat shield defined in claim 1, wherein the densities of protuberances in the radially innermost and outermost regions are between about 0.4 and about 0.7 of the density of protuberances in the inner and outer central regions.

6. A combustor dome comprising at least one heat shield mounted to an annular dome panel, at least one fuel nozzle opening defined in the heat shield, the heat shield having a back face facing the dome panel, the back face and the dome panel defining an air space therebetween, a ridge provided on said back face and extending laterally on each side of the nozzle opening on arc generally common with a centre of the nozzle opening, the ridge separating an inner central region from an outer central region, the inner central region being disposed radially inwardly of the ridge relative to a central axis of the combustor dome, the outer central region being disposed radially outwardly of the ridge relative to the central axis of the combustor dome, the back face having radially inner and radially outer peripheral regions respectively located radially inwardly of the inner central region and radially outwardly of the outer central region, pin fins provided on said back face, the density of pin fins in the inner and outer central regions being higher than in the radially inner and radially outer peripheral regions, and cooling holes defined in the dome panel on either side of the ridge in general alignment with the inner and outer central regions to direct cooling air against the back face of the heat shield in said inner and outer central regions, the inner and outer central regions being respectively in fluid flow communication with said radially inner peripheral region and said radially outer peripheral region for causing the cooling air received in said inner and outer central regions to respectively flow over said radially inner peripheral region and said radially outer peripheral region before being radially discharged from the heat shield into the combustor dome, wherein the radially inner and radially outer peripheral regions are hot spot regions requiring increased cooling relative to the inner and outer central regions.

7. The combustor dome defined in claim 6, wherein the densities of pin fins in the radially inner and radially outer peripheral regions is between about 0.4 and about 0.7 of the density of pin fins in the inner and outer central regions.

8. A heat shield comprising a body adapted to be mounted adjacent and spaced apart a distance from a dome of an annular combustor to define a cavity therebetween, the body defining at least one fuel nozzle opening, the body having a back face facing the combustor dome when mounted to the combustor, a central ridge projecting laterally from opposed sides of the fuel nozzle opening and dividing the back face into a radially outer half and a radially inner half, said radially outer half having an outer central region adjacent said central ridge and a radially outermost region adjacent a radially outer edge of the heat shield, said outer central region being in airflow communication with said radially outermost region, said radially inner half having an inner central region adjacent said central ridge and a radially innermost region adjacent a radially inner edge of the heat shield, said inner central region being in airflow communication with said radially innermost region, a plurality of protuberances extending from the back face, the density of protuberances in said inner and outer central regions being greater than the density of protuberances in said radially innermost and outermost regions, wherein the densities of protuberances in the radially innermost and outermost regions are between about 0.4 and about 0.7 of the density of protuberances in the inner and outer central regions.

* * * * *